May 26, 1936.  J. P. LARKIN  2,041,769
NITRIDING PROCESS
Filed Jan. 13, 1932
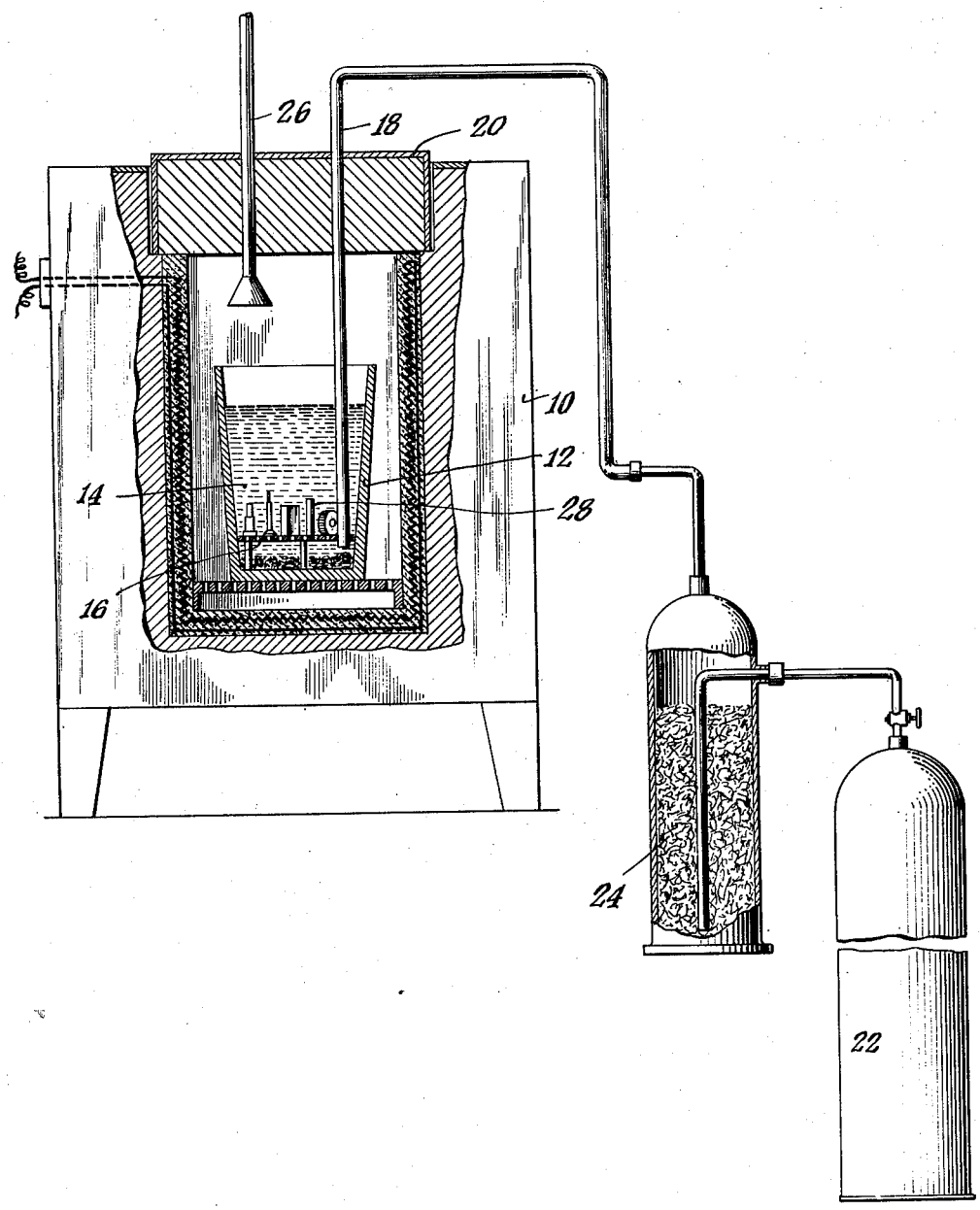
INVENTOR
John P. Larkin
BY
ATTORNEYS Patented May 26, 1936

2,041,769

UNITED STATES PATENT OFFICE 2,041,769

NITRIDING PROCESS

John P. Larkin, Detroit, Mich.

Application January 13, 1932, Serial No. 586,354

5 Claims. (Cl. 148—16)

This invention relates to the surface hardening by nitriding of articles made of ferrous materials, and in particular to an improved process of carrying out the nitriding treatment.

The nitriding treatment as heretofore carried out in commercial practice has involved exposure of the articles destined to be nitrided to a current of gaseous ammonia while maintained at temperatures generally varying from about 850° to 1150° F., this treatment being continued for upwards of 24 hours depending upon the thickness of the hardened case desired.

The present invention provides a process of producing the nitride hardened case in a relatively short period of time as compared with the current practice. The invention has the further advantage that the articles may be removed from the nitriding vessel while still hot and cooled either quickly or slowly without fear of oxidation. Another advantage of this process, outside of the saving of time in the nitriding treatment is the saving in time and expense that has heretofore been involved in heating up and cooling down the pieces. A still further advantage of the invention resides in the uniform distribution of the active nitrogen in reactive relation to the articles being nitrided in a simple manner and without recourse to special circulating fans or other circulating and distributing means tending to introduce complications into the operation of the nitriding apparatus. The invention has the further advantages that the importance of the control of dissociation of the ammonia within a definite percentage range is minimized and the quantity of ammonia required for nitriding is materially reduced. It is a further advantage of the invention that that proportion of the ammonia dissociation that is produced catalytically is relatively low as compared with the prior practice and is largely localized in the zone adjoining the articles being nitrided, thus assuring more effective use of the liberated active nitrogen.

According to the present invention the articles to be nitrided are immersed in an anhydrous fused salt bath through which a suitable nitrogen-liberating gaseous substance, for example, dry gaseous ammonia, is caused to pass at such a rate depending on the temperature employed as to insure a percentage dissociation of the ammonia such as will cause an optimum absorption of nitrogen by the metal under the conditions stated. The salt bath employed is formed of salts that are incapable of liberating carbon at the temperature employed.

The invention will be described in further detail by reference to the appended drawing wherein is represented a part vertical section and a part side elevation of a nitriding container and associated means for carrying out the nitriding treatment.

In the drawing 10 indicates generally an electrically heated furnace wherein the heating chamber consists of a pot 12 for receiving a salt bath 14. The furnace and the heating chamber may be generally similar to the salt bath heat treating furnaces heretofore known, with such modification as is necessary to permit of introduction of ammonia and withdrawal of the exhaust gases. To promote distribution of the ammonia and its uniform diffusion through the salt bath, a perforated tray 16 is provided and supported in spaced relation to the bottom of the pot. In the embodiment shown, the ammonia is led into the pot and discharged beneath the perforated tray by means of the pipe 18 which passes through the cover 20 of the furnace and is connected to an ammonia supply tank 22. It is advisable as shown to introduce one or more drying towers 24 into the pipe line 18 to insure the removal of even the very last traces of moisture from the ammonia. The amount of moisture in commercial anhydrous ammonia is very small but even the presence of very minute quantities would cause excessive boiling in the salt bath. An exhaust pipe 26 is shown as provided in the cover 20 and is connected to a suitable suction manifold not shown. A plurality of metal articles 28 are shown as disposed on the tray 16.

In starting the operation the pot is filled with a suitable salt mixture and brought up to the nitriding temperature. The most favorable temperatures appear to be between 1000° and 1100° F., although considerable variation from this range is permissible and sometimes desirable depending upon the particular composition of the ferrous material being nitrided and the character of the case,—depth, hardness, etc.,—desired to be imparted thereto. When the bath has been formed the gas is passed through until the bath has become saturated. The pieces to be nitrided can then be placed in the pot by suitable means.

When operating with a bath maintained at a temperature within the range 1000°–1100° F. and with introduction of the ammonia at a sufficiently rapid rate to insure a saturation of the bath at all times, it is possible to produce a nitride hardened case of from 0.10" to 0.15" in from one-half to one hour on an article made of an alloy steel containing say 0.2 to 0.4% C, 0.75 to 1.25% Al, 1.0 to 2% Cr and around 0.30% Mo. Similarly, a case of 0.30" may be produced in from two to three hours.

Salt mixtures should be used which fuse at low temperatures, which do not attack the steel, and which are incapable of liberating carbon at the temperature employed. A mixture of potassium and sodium nitrates so proportioned as to melt at approximately 300° F. may be employed. Other salt mixtures, such as mixtures of chlorides and carbonates are useful. Sodium chloride, potassium chloride, calcium chloride, sodium carbonate (soda ash) when mixed in suitable proportions will melt at the low temperatures required. Cyanides or mixtures of cyanides which liberate carbon at temperatures in the nitriding temperature range are excluded.

When the treatment of a particular batch of articles is completed, it is not necessary to allow the furnace to cool down, and consequently a saving in time and heating costs results when bringing the furnace back to heat for a fresh batch. The nitrided articles when withdrawn from the salt bath will carry an adherent salt film which serves to protect them from air oxidation if they are to be allowed to cool slowly therein. If it is desired to cool the articles quickly this may be done in any suitable way with assurance that the salt film will afford adequate protection until the article has become fully immersed in the cooling medium. When the articles have cooled the salt film may be easily removed in case it has not already been removed in the course of the cooling operation.

The shortening of the period of the nitriding cycle is probably to be accounted for in large measure by the fact that the fused salt mechanically absorbs the ammonia and brings it into very intimate contact with the articles being nitrided. Another factor that I believe to have a certain beneficial influence on the effective rate of nitriding is found in the better control of the rate of ammonia decomposition, and owing to the presence of the fused salt the assurance that the decomposition takes place largely by reason of the heating effect and hence in the interior portions of the fused bath adjacent the articles being nitrided. As a consequence the active nitrogen is in a better position to be absorbed by the articles before it has had a chance to change to the molecular state. It has heretofore been recognized that in the prior practice a large part of the ammonia decomposition takes place at or adjacent the walls of the container because of the catalytic effect of the metal composing the same. By using the fused bath and causing the ammonia to diffuse therethrough the proportion that will in the course of a given nitriding treatment come into contact with the walls of the pot is necessarily relatively limited. It has also been recognized that the articles being nitrided act to some extent to catalyze the ammonia. This effect is, of course, advantageous, since the active nitrogen is liberated at the surfaces upon which it is to act, and is preserved in the fused bath treatment. It results, therefore, that the desired catalytic decomposition is maintained and at the same time maintained under conditions most favorable for the absorption of the active nitrogen produced while the proportion of undesired catalytic decomposition is very materially reduced.

It is to be understood that in lieu of ammonia other gaseous nitrogen-liberating agents may be used, and in fact normally liquid nitrogen-liberating agents may be introduced provided they are vaporizable at or below the nitriding temperature range and decompose readily with liberation of nascent nitrogen when heated within such range. In substituting a gaseous or liquid agent for ammonia care should be taken to select an agent that does not in decomposing liberate substances that will attack the article being nitrided or set up undesired reactions in the salt bath.

While the invention has been described with reference to a particular form of apparatus and as applied to a particular type of steel, it is to be further understood that the apparatus and the nitridable steel disclosed are cited merely by way of example and that the invention is to be regarded as applicable to the treatment of any ferrous metal susceptible of absorbing nitrogen with formation of a hard case. In other words, the invention is not to be deemed as limited otherwise than as indicated by the language used in the appended claims.

I claim:

1. A process of nitriding which comprises immersing a ferrous article having a surface composition adapting it for surface hardening by nitriding in a fused salt bath incapable of liberating carbon at the temperature employed and, while maintaining said bath at a temperature of from about 850° to 1150° F., introducing into said bath a substance selected from the group of nitrogenous substances that exist in gaseous phase at temperatures within the range 850–1150° F. and are decomposable at a temperature within said range with liberation of nascent nitrogen, and continuing said treatment until a nitride case of desired depth has been formed, and finally cooling said article from said nitriding temperature.

2. A process of nitriding which comprises immersing a ferrous article having a surface composition adapting it for surface hardening by nitriding in a fused salt bath incapable of liberating carbon at the temperature employed and, while maintaining said bath at a temperature of from about 850° to 1150° F., passing a current of ammonia therethrough until a nitride case of desired depth has been formed, and finally cooling said article from said nitriding temperature.

3. The process of nitriding which comprises immersing an article made of a nitridable ferrous alloy in a fused salt bath incapable of liberating carbon at the temperature employed and, while maintaining said bath at a temperature of from about 850° to 1150° F., introducing into said bath a substance selected from the group of nitrogenous substances that exist in gaseous phase at temperatures within the range 850°–1150° F. and are decomposable at a temperature within said range with liberation of nascent nitrogen, continuing said treatment until a nitride case of desired depth has been formed, and finally cooling said article from said nitriding temperature.

4. The process of nitriding which comprises immersing an article made of a nitridable ferrous alloy in a fused salt bath incapable of liberating carbon at the temperature employed and, while maintaining said bath at a temperature of from about 850° to 1150° F., passing a current of ammonia therethrough until a nitride case of desired depth has been formed and finally cooling said article from said nitriding temperature.

5. A process of nitriding which comprises immersing an article made of a nitridable ferrous alloy in a fused mixture of nitrates of sodium and potassium and, while maintaining said mixture at a temperature of from about 850° to 1150° F., passing a current of ammonia therethrough until a nitride case of desired depth has been formed, and finally cooling said article from said nitriding temperature.

JOHN P. LARKIN.